S. C. ENGLISH.
APPARATUS FOR LOADING SHOCKS.
APPLICATION FILED JULY 28, 1908.

921,383.

Patented May 11, 1909.
5 SHEETS—SHEET 3.

S. C. ENGLISH.
APPARATUS FOR LOADING SHOCKS.
APPLICATION FILED JULY 28, 1908.

921,383.

Patented May 11, 1909.

5 SHEETS—SHEET 5.

Witnesses
Inventor
S. C. English,
By Franklin N. Hoyt
Attorney

UNITED STATES PATENT OFFICE.

SAMUEL COUNTESS ENGLISH, OF ARDTREA, ONTARIO, CANADA.

APPARATUS FOR LOADING SHOCKS.

No. 921,383.   Specification of Letters Patent.   Patented May 11, 1909.

Application filed July 28, 1908. Serial No. 445,753.

*To all whom it may concern:*

Be it known that I, SAMUEL C. ENGLISH, a subject of the King of England, residing at Ardtrea, in the county of Simcoe, Ontario, Canada, have invented certain new and useful Improvements in Shock-Loading Apparatus; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in apparatus for picking up and loading shocks in the field and depositing the same in a wagon or other suitable receptacle.

The invention comprises various details of construction, combinations and arrangements of parts which will be hereinafter fully described and then specifically defined in the appended claims.

My invention is illustrated in the accompanying drawings, in which:—

Figure 1:
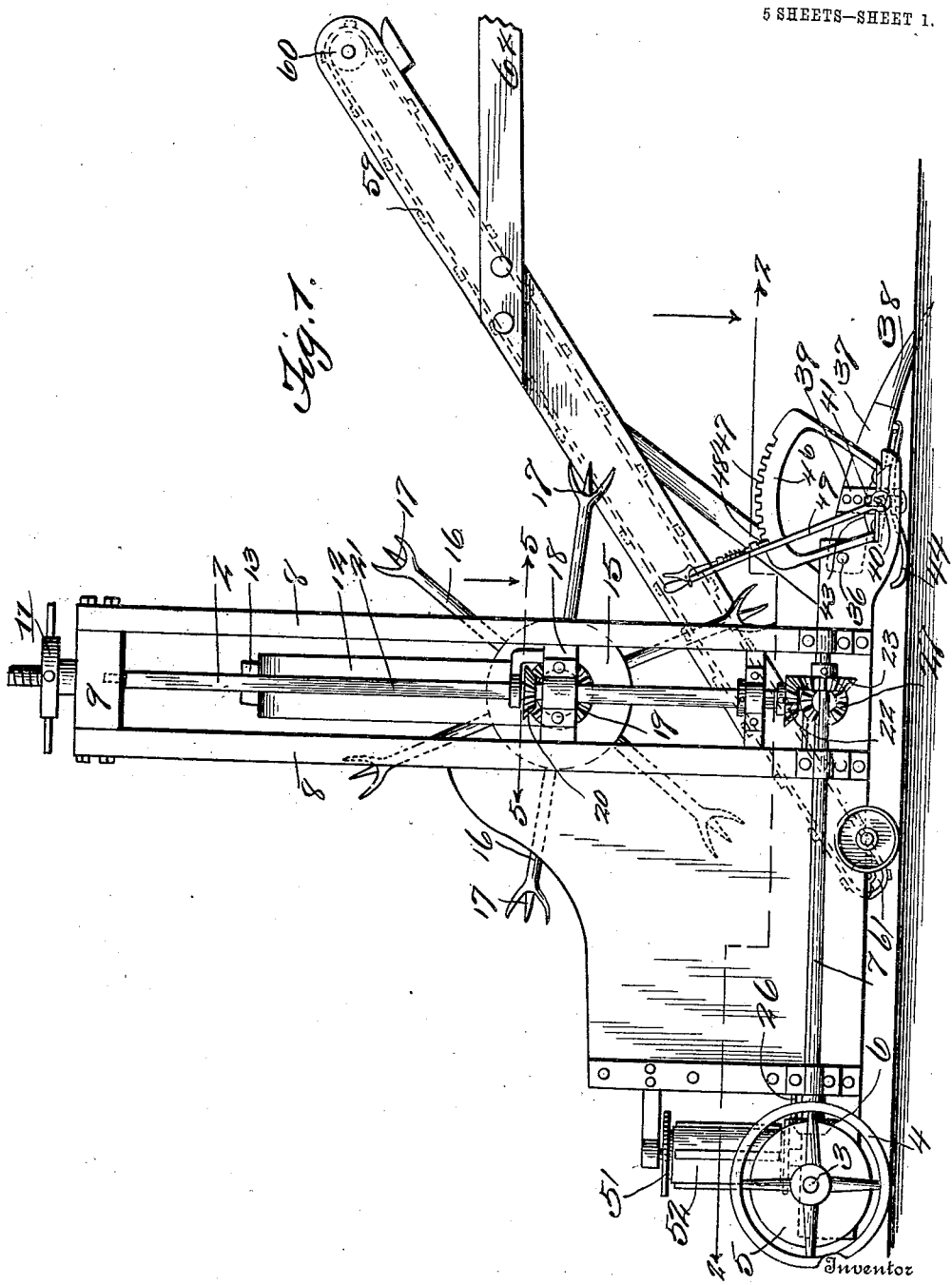
Figure 2:
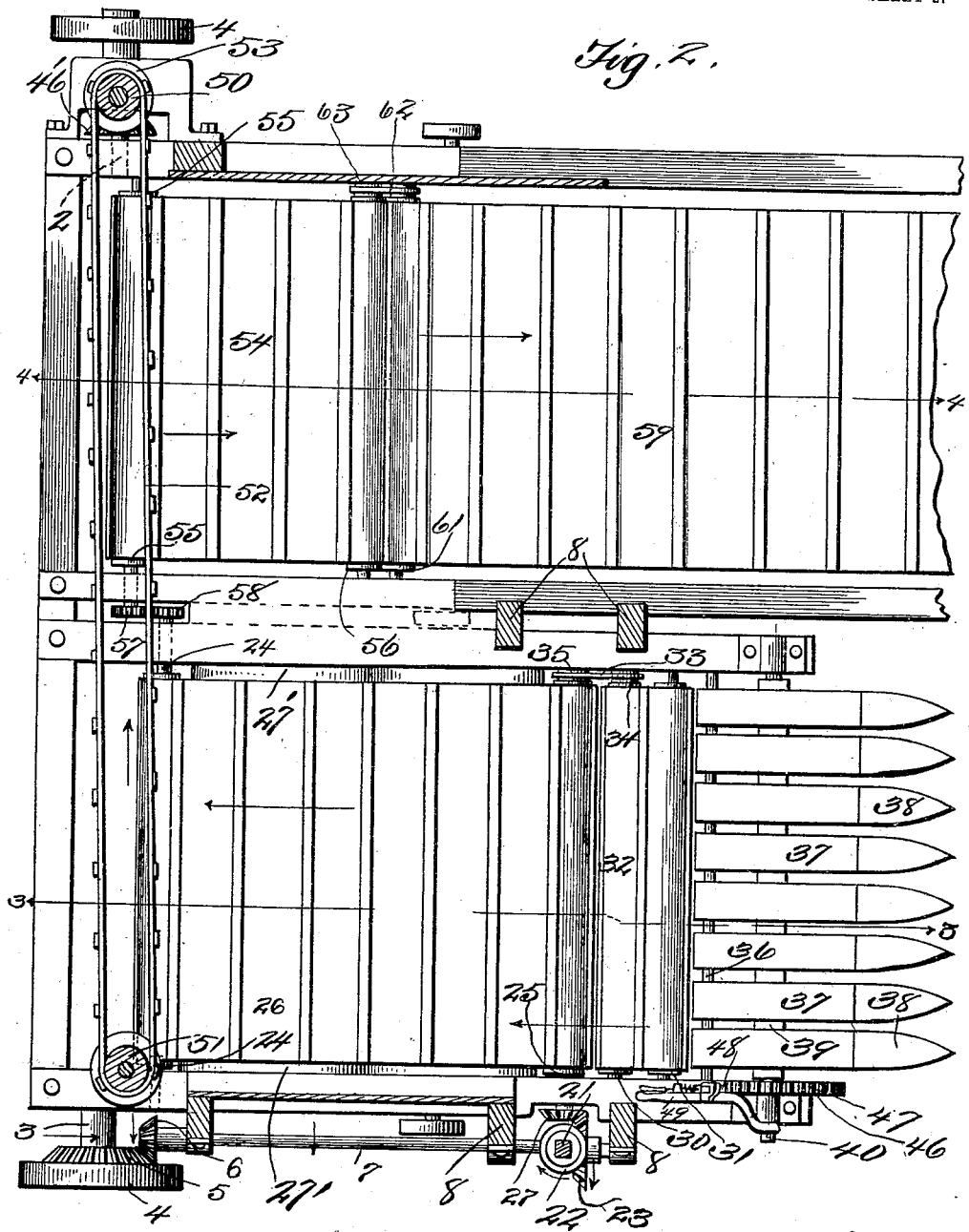
Figure 3:
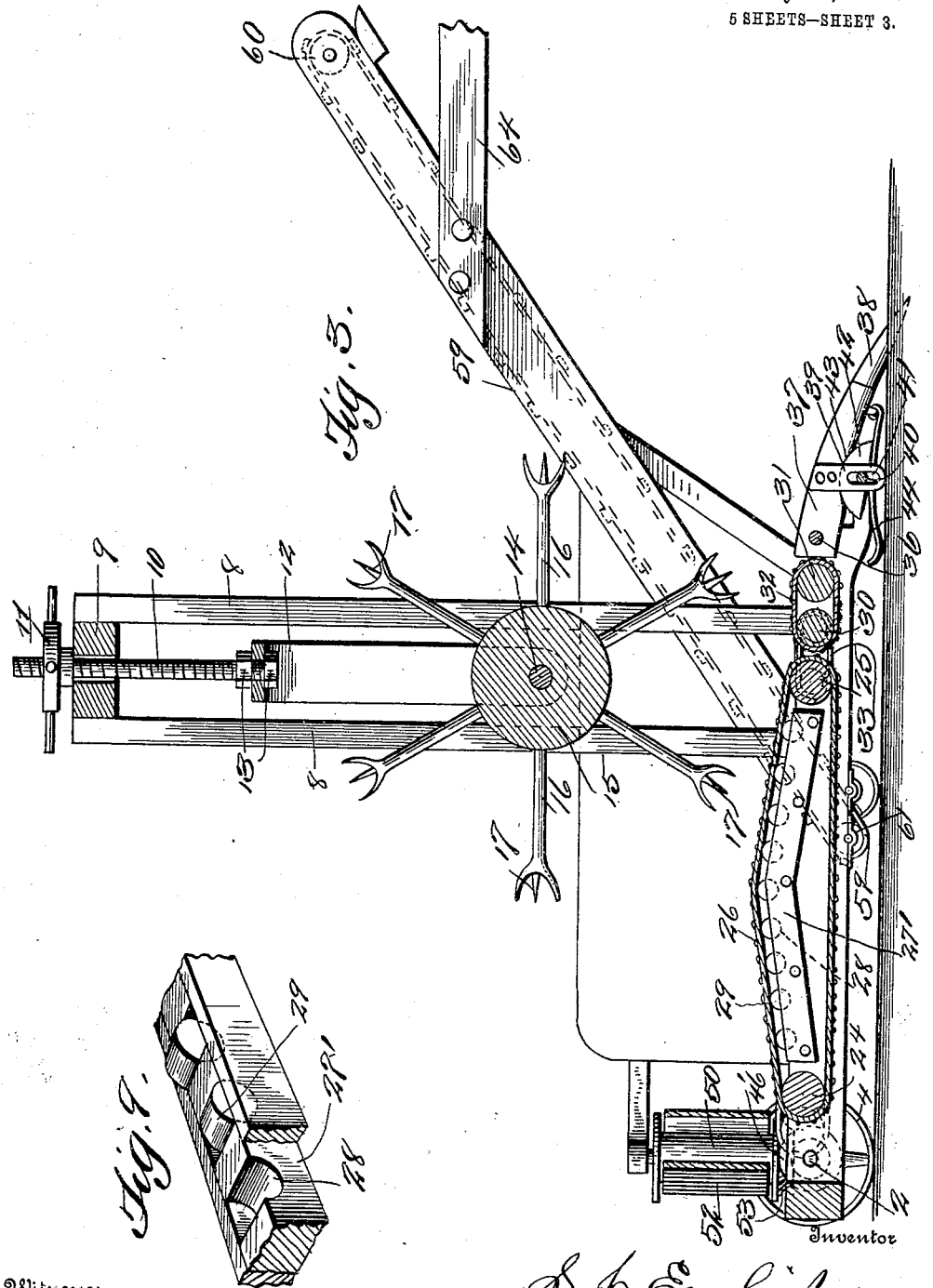
Figure 4:
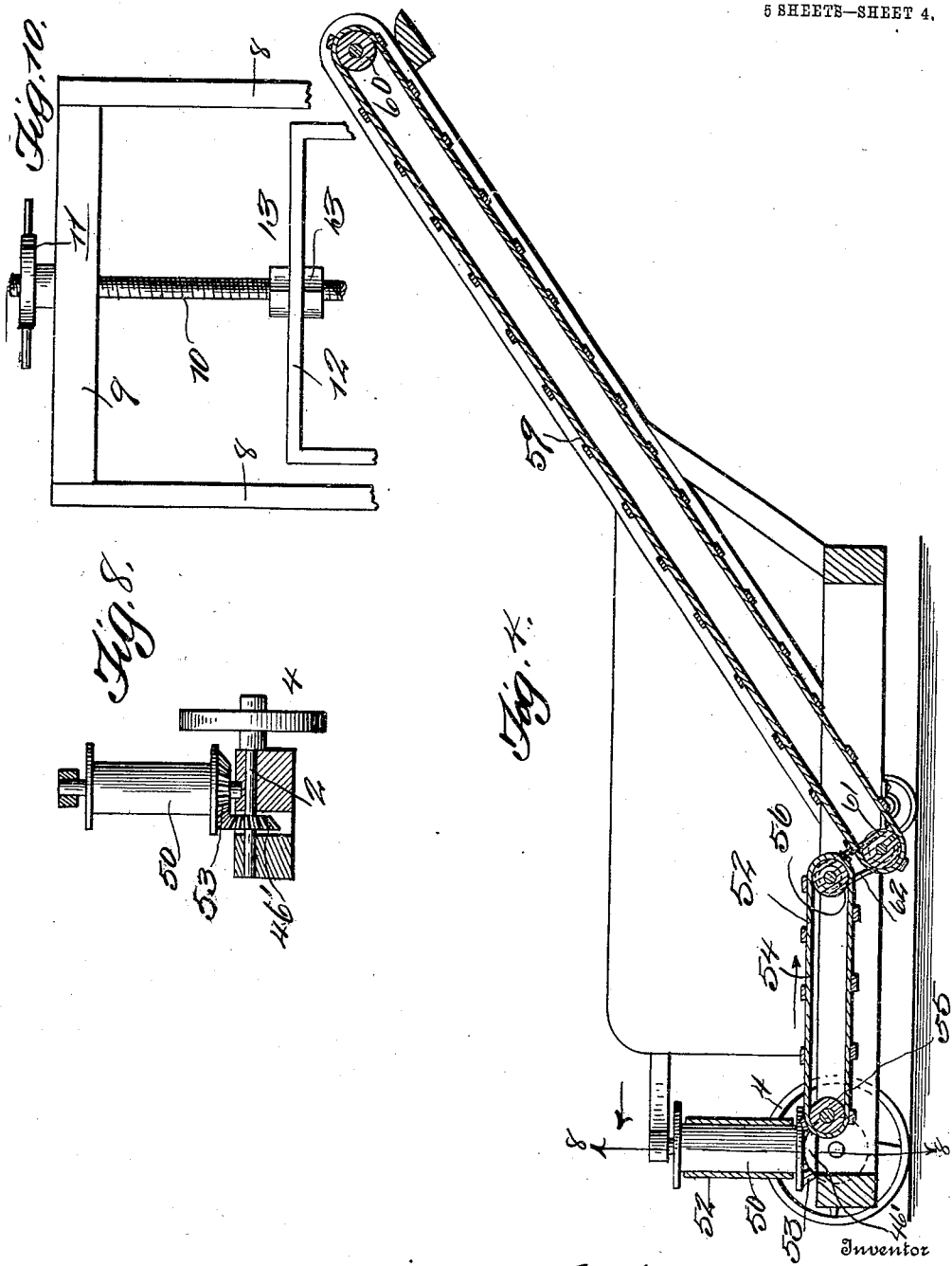
Figure 5:
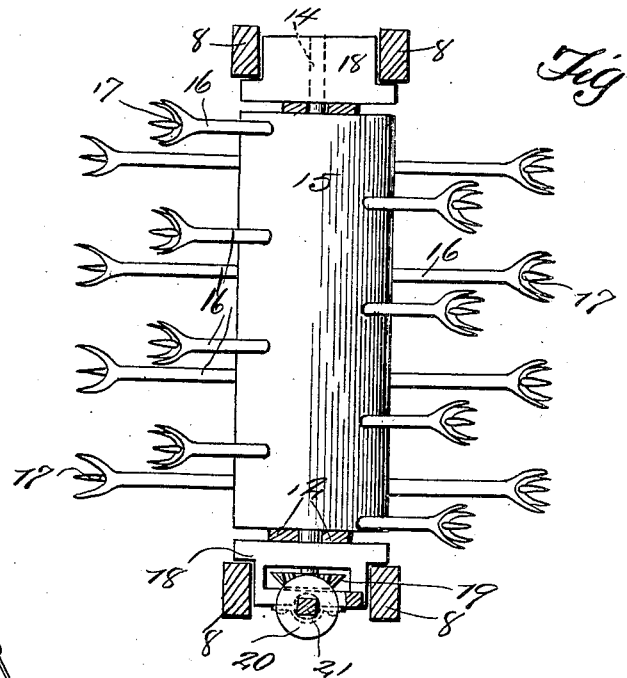
Figure 6:
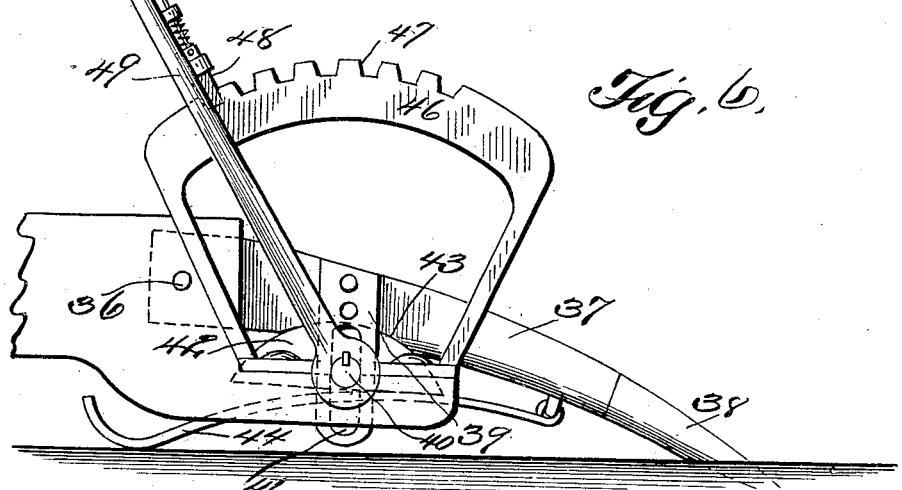
Figure 7:
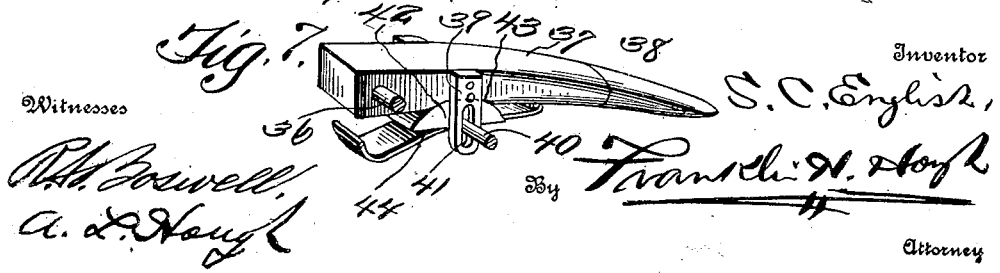

Figure 1 is a side elevation of the apparatus. Fig. 2 is a sectional view on line 2—2 of Fig. 1. Fig. 3 is a sectional view on line 3—3 of Fig. 2. Fig. 4 is a sectional view on line 4—4 of Fig. 2. Fig. 5 is a cross sectional view through the standard of the apparatus showing in top plan view a cylinder with feeding fingers thereon. Fig. 6 is an enlarged detail in elevation showing the means for adjusting the shock raising point. Fig. 7 is an enlarged detail view of the adjustable shock raising fingers. Fig. 8 is a sectional view on line 8—8 of Fig. 4. Fig. 9 is an enlarged detail view of roller mechanism upon which one of the conveyers travels, and Fig. 10 is a front elevation of the upper portion of the standards and yoke shown in Fig. 3.

Reference now being had to the details of the drawings by numeral, 1 designates the frame of the apparatus having stub shafts 2 and 3 mounted in suitable bearings in said frame and each of said shafts has a driving wheel 4 fixed thereto, and 5 is a beveled gear wheel fixed to the stub shaft 3 and is adapted to mesh with a pinion 6 keyed to the shaft 7 which is journaled in suitable bearings in the frame of the apparatus. Rising from said frame are the standards 8, shown in Figs. 1 and 3 of the drawings, and the upper ends of said standards are connected by a cross-piece 9, shown in Fig. 10 of the drawings, which cross-piece is provided with a central opening for the reception of the screw 10, shown clearly in Figs. 3 and 10 of the drawings. A threaded hand wheel 11 is fitted to the upper end of said screw and has a hub portion adapted to bear against the upper surface of the cross-piece about the marginal edge of the opening therein through which said screw passes.

A yoke designated by numeral 12, a detail of the upper portion of which is shown in Fig. 10 of the drawings, is mounted upon said screw 10 and held thereon by means of the nuts 13 and in the arms of said yoke the shaft 14 is journaled upon which is fixed a cylinder 15 having a series of radially disposed rods 16 with spurred ends 17 forming shock lifting fingers. Said shaft 14 also passes through the blocks 18 in which the shaft has bearings, said blocks having shouldered portions upon their opposite edges adapted to engage the marginal edges of the standards 8, portions of each block being guided between said standards, as shown clearly in Fig. 5 of the drawings. A beveled pinion 19 is fixed to one end of the shaft 14 and is in mesh with a beveled pinion 20 which is loosely mounted upon and movable with the shaft 21. Said shaft 21 is preferably angularly outlined and at the lower end of the shaft 21 is fixed a beveled pinion 22 which is in mesh with a similar gear wheel 23 fixed to said shaft 7. Mounted upon rollers 24 and 25 is an endless conveyer 26 and a beveled pinion 27 is fixed to the spindle end of the roller 25 and is in mesh with said beveled gear 23 and affords means whereby the conveyer 26 may be driven. An angular rack, designated by numeral 27', is mounted upon the framework of the apparatus and has a series of semi-cylindrical recesses 28 formed in the upper inclined edges thereof, as shown in Fig. 9 of the drawings, and cylindrical rollers 29 are seated in said recesses with their upper portions projecting above the upper edges of said recessed rack and afford means upon which the conveyer 26 travels and serves to reduce the friction intermediate the conveyer and said rack.

Pivotally mounted in suitable bearings in the frame of the apparatus are the two rollers 30 and 31, and 32 designates an endless conveyer passing about said rollers 30 and 31. The conveyer 32 is driven by a sprocket chain 33 which passes over the sprocket wheels 34 and 35 mounted respectively upon the spindle end of the rollers 25 and 30. Immediately in front of the roller 31 is a rod 36 upon which a series of shock lifting fingers 37 are pivotally mounted, detail views of said fingers being shown in Figs. 6 and 7 of the drawings. Each of said fingers has a removable point 38 and each is provided with two slotted plates 39, the free ends of which extend below the fingers, and 40 designates a rod which is mounted in the slots 41 of the plates 39, and 42 designate semi-cylindrical blocks having their convexed surfaces adjacent to and engaging the concaved recesses 43 formed one in the under surface of each finger. A spring 44 is pivotally connected at its forward ends to each finger and the flat surface of the member 42 is adapted to bear against said spring. Fixed to the frame of the apparatus is a segment 46, shown clearly in Figs. 1 and 6 of the drawings, and is provided with a series of teeth 47 for the engagement of the pawl 48 carried by the lever 49, which latter is keyed to the shaft 40 and serves as a means for rocking the latter and also the semi-cylindrical blocks 42 therein when it is desired to prevent the fingers 37 from entering furrows in the ground over which the apparatus is operated.

Mounted in suitable bearings in the frame of the apparatus are the two vertically disposed rollers 50 and 51 about which a vertically movable conveyer 52 travels. Said vertical roller 50 has a beveled pinion 53 fixed to its lower end, as shown clearly in Figs. 3 and 8 of the drawings, which is in mesh with a beveled gear 46' mounted upon the stub shaft 2 and affords means for driving the endless conveyer 52. A horizontally disposed conveyer, designated by numeral 54, travels about the rollers 55 and 56, shown in Fig. 4 of the drawings, and said conveyer 54 is driven by means of a pinion 57 fixed to the spindle end of the roller 55, as shown clearly in Fig. 2 of the drawings, and which pinion 57 is in mesh with a pinion 58 upon the spindle end of the shaft 24. An inclined hoisting conveyer, designated by numeral 59 and shown clearly in Figs. 1, 3 and 4 of the drawings, travels about the rollers 60 and 61, the latter of which is provided with a sprocket wheel upon its spindle end which has a chain 62 connecting the same with a sprocket wheel 63 upon the roller 56, thereby affording means for driving said inclined conveyer 59. The upper portion of the frame of said inclined conveyer has bars 64 fastened thereto and affords means whereby the apparatus may be attached in any suitable manner to a wagon box or other receptacle into which it is desired to deposit the shocks of grain being raised.

The operation of my improved apparatus for hoisting and delivering shocks of grain is as follows:—The machine being attached to a wagon or other machine for depositing the shocks as they are elevated is driven over the grain field and the shocks picked up by the fingers 37, the operator having within convenient reach means for adjusting the fingers to ruts and uneven surfaces of the ground. The shocks coming upon the fingers will be caught by the spurred fingers 17 upon the roller 15 which is rotated by the gear connections shown and the shocks will be moved back upon the conveyers 32 and 26 and, as the shocks come in contact with the vertically mounted conveyer 48, they will be raised sidewise and, as they come in contact with the horizontally disposed conveyer 54, shown in Fig. 4 of the drawings and which travels in the direction of the arrow, the shocks will be raised forward and, falling upon the inclined conveyer 59, will be elevated and will drop into the wagon box or other receptacle to which the apparatus is attached.

By the provision of the adjusting features of my invention, the roller carrying the spurred fingers may be raised and lowered by the manipulation of the hand lever, accordingly as may be necessary in adapting the apparatus to uneven surfaces of the ground.

From the foregoing, it will be noted that, by the provision of a shock gathering apparatus as shown and described, a simple and efficient mechanism is afforded whereby, as the machine travels over a grain field, the shocks may be conveniently raised and deposited into a wagon to which the apparatus is attached or to any other receptacle as may be desired.

What I claim to be new is:—

1. An apparatus for gathering and depositing shocks of grain comprising a framework, driving wheels upon which the latter is mounted, a series of shock raising fingers, horizontally disposed conveyers having gear connections with the driving wheels for operating the same, a vertically movable rotatable member, shock engaging points carried by said member and adapted to move the shocks from said fingers upon the conveyers, an upwardly and forwardly inclined endless conveyer, and means for moving the shocks thereon from said horizontally disposed conveyers, as set forth.

2. An apparatus for gathering and depositing shocks of grain comprising a framework, driving wheels upon which the latter is mounted, a series of shock raising fingers, horizontally disposed conveyers having gear connections with the driving wheels for operating the same, a vertically adjustable cylinder, means for rotating the same, rods projecting from said cylinder and having spurred ends adapted to engage and move shocks from said fingers upon the conveyers adjacent thereto, an upwardly and forwardly inclined elevator, and means for moving the shocks thereon from said horizontally disposed conveyers, as set forth.

3. An apparatus for gathering and depositing shocks of grain comprising a framework, driving wheels upon which the latter is mounted, a series of shock raising fingers, horizontally disposed conveyers having gear connections with the driving wheels for operating the same, standards rising from said framework, a yoke supported by said standards, a cylindrical member journaled in said yoke, rods secured to said cylinder, an upwardly and forwardly inclined conveyer, and means for moving a shock thereon from said horizontally disposed conveyers, as set forth.

4. An apparatus for gathering and depositing shocks of grain comprising a framework, driving wheels upon which the latter is mounted, a series of shock raising fingers, horizontally disposed conveyers having gear connections with the driving wheels for operating the same, standards rising from said framework, a yoke adjustably mounted upon said standards, a cylinder having spindle ends journaled in said yoke, rods secured to said cylinder and having spurred ends, means for rotating the cylinder, an upwardly and forwardly inclined conveyer, and means for moving the shocks thereon from said horizontally disposed conveyers, as set forth.

5. An apparatus for gathering and depositing shocks of grain comprising a framework, driving wheels upon which the latter is mounted, a series of shock raising fingers, horizontally disposed conveyers having gear connections with the driving wheels for operating the same, standards rising from said framework, a yoke adjustably mounted upon said standards, blocks movably held between the uprights of said standards and a cylinder having spindle ends mounted in said blocks, a vertically disposed shaft, a gear connection between said cylinder and vertical shaft, an upwardly and forwardly inclined conveyer, and means for moving the shocks thereon from said horizontally disposed conveyers, as set forth.

6. An apparatus for gathering and depositing shocks of grain comprising a framework, driving wheels upon which the latter is mounted, a series of shock raising fingers, horizontally disposed conveyers having gear connections with the driving wheels for operating the same, standards rising from said framework, a cross-piece connecting said standards, a yoke, a screw fastened thereto passing through an aperture in said cross-piece, an adjusting wheel having threaded connection with said screw and adapted to bear against said cross-piece, rods connected to said cylinder and having spurred points, mechanism for rotating the cylinder, an upwardly and forwardly inclined conveyer, and means for moving shocks thereon from said horizontally disposed conveyers, as set forth.

7. An apparatus for elevating and depositing shocks of grain comprising a frame, driving wheels mounted thereon, fingers for picking up the shocks, a rack mounted upon said frame provided with recesses, anti-friction rollers mounted in said recesses, a conveyer traveling upon said anti-friction rollers, means for operating the conveyer, a vertically adjustable rotatable member for moving the shocks from said fingers upon said conveyer, an upwardly and forwardly inclined conveyer, and means for moving the shocks thereon, as set forth.

8. An apparatus for elevating and depositing shocks of grain comprising a framework, conveyers thereon, means for operating said conveyers, a series of pivotal shock raising fingers, a spring pivotally connected to each finger, a semi-cylindrical finger engaging member underneath each of said fingers, a shaft to which said finger engaging members are fastened, and a lever connected to said shaft, as set forth.

9. An apparatus for elevating and depositing shocks of grain comprising a framework, conveyers thereon, means for operating said conveyers, a series of pivotal shock raising fingers, a spring pivotally connected to each finger, a semi-cylindrical finger engaging member underneath each of said fingers, a shaft to which said finger engaging members are fastened, slotted plates secured to said fingers and through which said shaft passes, a lever connected to said shaft and adapted to rock the same, as set forth.

10. An apparatus for elevating and depositing shocks of grain comprising a framework, conveyers thereon, means for operating said conveyers, a series of pivotal shock raising fingers, means for tilting said fingers, a spring pivotally connected to each finger, a semi-cylindrical finger engaging member underneath each of said fingers, a shaft to which said finger engaging member is fastened, slotted plates secured to said fingers and through which said shaft passes, a lever connected to said shaft and adapted to rock the same, the under surface of each finger having a concaved recess in which the convexed surface of said finger engaging member engages, a toothed segment, and a pawl carried by said lever and adapted to engage the teeth of said segment, as set forth.

In testimony whereof, I hereunto affix my signature in the presence of two witnesses.

SAMUEL COUNTESS ENGLISH.

Witnesses:
F. G. EVANS,
NORAH HEWETT.